(12) United States Patent
Gutelius

(10) Patent No.: US 8,905,200 B2
(45) Date of Patent: Dec. 9, 2014

(54) BRACKETLESS CALIPER

(76) Inventor: Kenneth Eric Gutelius, Lake Orion, MI (US)

( * ) Notice: Subject to any disclaimer, the term of this patent is extended or adjusted under 35 U.S.C. 154(b) by 155 days.

(21) Appl. No.: 13/616,409

(22) Filed: Sep. 14, 2012

(65) Prior Publication Data

US 2014/0076672 A1  Mar. 20, 2014

(51) Int. Cl.
*F16D 65/14*  (2006.01)
*F16D 65/18*  (2006.01)

(52) U.S. Cl.
CPC ..................................... *F16D 65/18* (2013.01)
USPC ................... 188/73.42; 188/73.41; 188/73.46

(58) Field of Classification Search
USPC ............... 188/71.1, 72.1, 72.4, 73.34, 73.41, 188/73.42, 73.46
See application file for complete search history.

(56) References Cited

U.S. PATENT DOCUMENTS

| | | | | |
|---|---|---|---|---|
| 2,533,186 A * | 12/1950 | Bricker et al. | ............. | 188/73.41 |
| 3,260,332 A | 7/1966 | Wells | | |
| 3,322,236 A * | 5/1967 | Burnett | ...................... | 188/73.41 |
| 3,438,465 A * | 4/1969 | Butler | ......................... | 188/73.41 |
| 3,478,844 A * | 11/1969 | Beuchle | ...................... | 188/72.5 |
| 3,997,034 A | 12/1976 | Kellogg | | |
| 4,342,380 A | 8/1982 | Melinat | | |
| 4,537,290 A * | 8/1985 | Evans | ......................... | 188/73.31 |
| 4,681,194 A | 7/1987 | Tsuruta | | |
| 4,716,994 A | 1/1988 | Iwamoto | | |
| 4,856,620 A | 8/1989 | Thiel et al. | | |
| 4,926,978 A * | 5/1990 | Shibata et al. | ........... | 188/251 M |
| 5,099,961 A | 3/1992 | Dreilich | | |
| 6,250,439 B1 * | 6/2001 | Matsuzaki | ................. | 188/73.31 |
| 6,367,595 B1 | 4/2002 | Mori | | |
| 7,357,228 B2 | 4/2008 | Okayama | | |
| 2002/0104719 A1 * | 8/2002 | Nakayama et al. | ........ | 188/73.46 |
| 2004/0065515 A1 | 4/2004 | Seeley | | |
| 2004/0100058 A1 | 5/2004 | Baker | | |
| 2004/0188188 A1 | 9/2004 | Barbosa | | |
| 2006/0124404 A1 | 6/2006 | Morais | | |
| 2012/0080276 A1 * | 4/2012 | Kahan et al. | ................. | 188/73.1 |

* cited by examiner

*Primary Examiner* — Thomas J Williams
(74) *Attorney, Agent, or Firm* — The Dobrusin Law Firm, P.C.

(57) ABSTRACT

A device comprising: a caliper comprising: one or more piston bores housing a piston; an outboard pad retainer; a bridge; and a shoulder; wherein the caliper is attached directly to a knuckle of an automobile via the shoulder.

20 Claims, 7 Drawing Sheets

BRACKETLESS CALIPER

FIELD

The present teachings generally relate to a caliper that is directly attached to a knuckle and/or support device and is free of a support bracket.

BACKGROUND

The present teachings are predicated upon providing an improved disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, the like, or a combination thereof. However, the present teachings are most suitable for use with a passenger vehicle (i.e. a car, truck, sports utility vehicle, or the like). Typical disc brake systems have either a floating caliper or a fixed caliper as discussed below.

Generally, a floating caliper braking system includes a rotor, a caliper body, a support bracket, and ah inboard brake pad and an outboard brake pad located on opposing sides of the rotor. The caliper body further includes a bridge, one or more fingers, and a piston bore. The piston bore houses a piston. The piston bore has a bore axis that the piston moves along during a brake apply and a brake release. The piston bore may include a fluid inlet, a closed wall, a front opening, and a cylindrical side wall that has a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad and then the brake pad into contact with a rotor. The caliper housing, upon the brake pad contacting the rotor, moves so that the one or more fingers contact the opposing brake pad and then move the opposing brake pad into contact with the opposing side of the rotor so that a braking force is created. Some examples of floating style disc brakes may be found in U.S. Pat. Nos. 3,260,332; 3,997,034; 4,342,380; 4,881,194; 4,716,994; and 7,357,228 all of which are incorporated by reference herein for all purposes.

Generally, a fixed caliper braking system includes a rotor, a caliper body, a support bracket, and an inboard brake pad and an outboard brake pad located on opposing sides of the rotor. The caliper body includes a bridge, an inboard piston bore having an inboard piston, and an outboard piston bore having an outboard piston. The outboard piston and the inboard piston are located on opposite sides of the rotor so that during a brake apply both pistons move each respective brake pad into contact with the respective sides of the rotor. During a brake apply, the caliper remains generally static as the inboard piston and the outboard piston travel toward each other moving the respective brake pad into contact with opposing sides of the rotor so that a braking force is created. Some examples of fixed disc brake systems may be found in U.S. Pat. Nos. 5,099,981 and 6,387,595 all of which are incorporated by reference herein for all purposes.

Examples of additional brake systems are found in and U.S. Patent Application Publication Nos. 2004/0100058, 2004/0188188, and 2006/0124404. However, some of these systems include multiple parts to function, are heavy; or both, thus, adding weight to the overall weight of vehicle, which affects the overall fuel economy of the vehicle.

It would be attractive to have a brake system that is reduced in mass so that the overall mass of the system in which it is installed is reduced. It would be attractive to have a device with a reduced mass and a reduced number of parts, while maintaining braking performance. What is needed is a device that reduces the mass and/or number of parts while maintaining a low taper wear for the brake pads, low disc thickness variation (DTV) of the rotor and low brake torque variation (BTV) of the brake pads so that the operator and/or passengers do not experience any adverse effects on the system.

SUMMARY

The present teachings meet one or more of the present needs by providing: a device comprising: a caliper comprising; one or more piston bores housing a piston; an outboard pad retainer; a bridge; and a shoulder; wherein the caliper is attached directly to a knuckle of an automobile via the shoulder.

The present teachings provide a disc brake system comprising: a caliper comprising; one or more piston bores housing a piston; an outboard pad retainer; a bridge having a rail so that an inboard brake pad moves along the rail during a brake apply, a brake off, or a condition thereof; an inboard pad retainer; and a shoulder including one or more attachment features that extend through the shoulder; a rotor connected to a knuckle of an automobile, wherein the bridge extends over the rotor; wherein the caliper is attached directly to the knuckle via the shoulder and the caliper is free of attachment to a support bracket; and wherein the one or more attachment features are larger than one or more fasteners so that the one or more fasteners when placed in the one or more attachment features are capable of moving, the caliper when attached is capable of moving, or both.

The teachings herein surprisingly solve one or more of these problems by providing a device having a brake system that is reduced in mass so that the overall mass of the system in which it is installed is reduced. The present teachings are a device having a reduced mass and a reduced number of parts, while maintaining braking performance. The present teachings are a device that reduces the mass and/or number of parts while maintaining a low taper wear for the brake pads, low disc thickness variation (DTV) of the rotor and low brake torque variation (BTV) of the brake pads so that the operator and/or passengers do not experience any adverse effects on the system.

BRIEF DESCRIPTION OF THE DRAWINGS

FIG. 8 illustrates one possible embodiment of a brake pad that may be used with the disc brake system;

DETAILED DESCRIPTION

Figure 1:
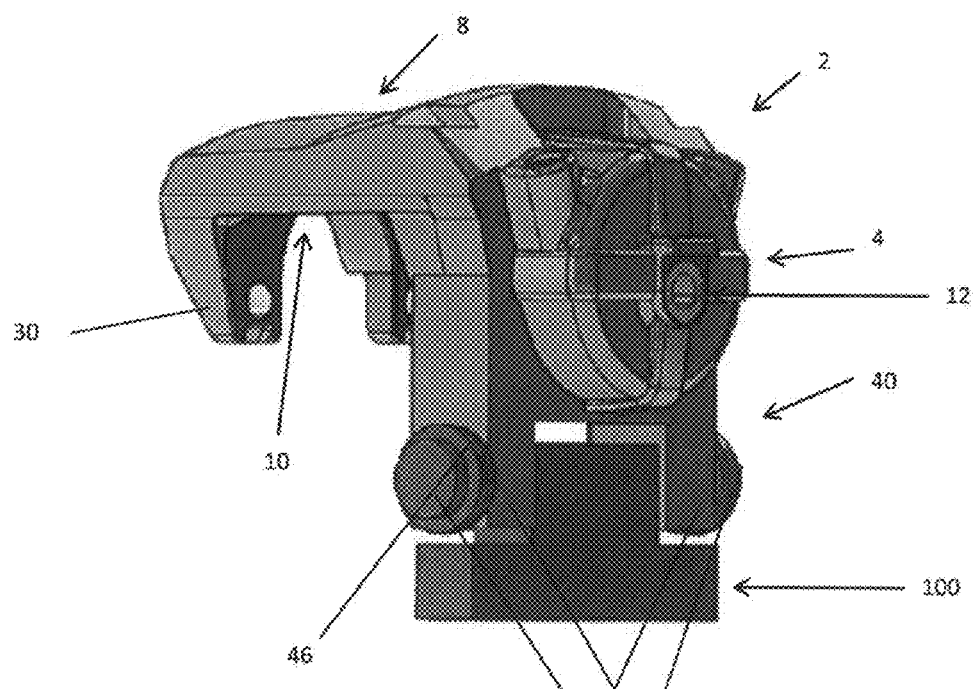
FIG. 1 illustrates one possible embodiment of the disc brake system.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for ail purposes. Other combinations are also possible as will be gleaned from the following claims, which are also hereby incorporated by reference into this written description.

The present teachings relate to a brake assembly. The brake assembly may be any brake assembly that provides a friction force during a brake apply. Preferably, the brake assembly is attached to a knuckle of a vehicle and/or a support device so that the brake assembly may be used to create a friction force during a brake apply. More preferably, the brake assembly is free of a support bracket for attaching a caliper to a knuckle or a support device. Even more preferably, a shoulder of the caliper is attached directly to a support device (e.g., part of a machine or a knuckle). The brake assembly as taught herein may be a disc brake system. The disc brake system may be used in conjunction with a lathe, winder for paper products or cloth, amusement park rides, wind turbines, the like, or a combination thereof (i.e., the brake assembly may be attached to a support device of one or more of these devices so that it may be used to create a braking force). However, the disc brake system is preferably most suitable for use with a passenger vehicle (i.e. a car, truck, sports utility vehicle, or the like).

The disc brake system includes a caliper, a rotor, and two opposing brake pads. The caliper may be any caliper that may be attached directly to a knuckle and/or support device and create a braking force. The caliper may be any caliper that may be free of a support bracket for connection to a support device. The caliper may be free of connection to a support bracket. The caliper includes a shoulder, one or more piston bores, one or more pistons in the one or more piston bores, an outboard pad retainer, a bridge connecting the outboard pad retainer to the one or more piston bores, and optionally an inboard pad retainer connected to the bridge and/or the piston bore.

The outboard pad retainer may be any device that assists a brake pad in producing a friction force during a brake apply. The outboard pad retainer may be any device that holds a brake pad, a friction plate, friction material, a pressure plate, or a combination thereof (hereinafter "brake pad"). A brake pad may be permanently attached to the outboard pad retainer. A brake pad may foe removably attached to the outboard pad retainer. The outboard pad retainer may be connected to one or more rails of the bridge by one or more rail attachments. The outboard pad retainer may be movable.

The outboard pad retainer may be moved by an outboard piston located in an outboard piston bore. The outboard pad retainer may attach the brake pact to a piston so that the piston and brake pad move in unison. The brake pad may be supported on the piston by the outboard pad retainer so that the outboard pad retainer is free of attachment to the bridge. The outboard pad retainer may move along an axial direction with respect to a piston bore so that a friction force may be created. The outboard pad retainer may move along the bridge. Preferably, the outboard pad retainer is fixed. The outboard pad retainer may be a unitary piece extending from the bridge. The outboard pad retainer and the bridge may be formed together. The outboard pad retainer may remain static during a brake apply with respect to the bridge of the caliper. For example, the entire caliper may move and thus the outboard pad retainer may move with the caliper; however, the outboard pad retainer remains static relative to the bridge. The outboard pad retainer may include a sufficient amount of fingers so that a brake force may be created during a brake apply. The outboard pad retainer may have 1 or more fingers, 2 or more fingers, or 3 or more fingers. The outboard pad retainer may form an angle with the bridge and/or the piston bore axis. The outboard pad retainer may form a sufficient angle with the bridge, a plane substantially parallel to the bridge, the piston bore axis, or a combination thereof so that the outboard pad retainer assists in creating a brake apply. The outboard pad retainer may form substantially a right angle with the bridge. Preferably, the outboard pad retainer forms an angle of about 80 degrees or more, about 90 degrees or more, about 95 degrees or mores about 100 degrees or more, or even about 105 degrees or more with the bridge, the piston bore axis, or both. The outboard pad retainer may form an angle of about 150 degrees or less, about 135 degrees or less, or about 125 degrees or less with the bridge, the piston bore axis, or both.

The bridge may be any device that connects the outboard pad retainer with a piston bore, an inboard pad retainer with a piston bore, a piston bore to an opposing piston bore, or a combination thereof. The bridge may attach two opposing portions of the caliper together. The bridge may foe any device that extends over a rotor. The bridge may be any device that assists in creating a brake apply. The bridge may include a rail.

The rail may be any device that allows one or more part of the device to move so that a brake apply is created. The rail may be any device so that the outboard pad retainer, the inboard pad retainer, an inboard brake pad, an outboard brake pad, or a combination thereof may move during a brake apply. The rail may be located at any ideation along the bridge. The rail may be integrally formed in a surface of the bridge. The rail may extend out from a surface of the bridge. The rail may be a groove that is connected with a rail attachment of the outboard pad retainer, the inboard pad retainer, an inboard brake pad, an outboard brake pad, or a combination thereof. The rail may extend along all or a portion of the bridge. The rail may be configured so that the rail and rail attachment form a mating relationship. The rail may be any configuration so that a rail attachment may move along the rail. The rail may be any configuration so that a rail attachment may not be removed from the rail without disassembling all or a portion of the rail and/or the rail attachment. The rail may be configured so that a brake pad is directly attached to the rail so that the brake pad slides axially along the rail during a brake apply. The rail may be "T-shaped" cavity, a "T-shaped" projection, an "L-shaped" projection, a bail shaped cavity with a thin post shaped opening region, a larger inner cavity with a thinner opening, a bar located on an outside of the bridge, or a combination thereof. The bridge may be free of a rail. For example, pins may extend axially, relative to the piston bore, adjacent to the bridge for supporting and/or assisting in movement of one or more brake pads, the outboard pad retainer, the inboard pad retainer, or a combination thereof. Preferably, the bridge supports the inboard pad retainer and includes a rail so that the inboard pad retainer may move along the bridge during a brake apply via a rail attachment.

The rail attachment and the rail may have any relationship so that the rail retains the rail attachment and allows the pad retainers (i.e., the inboard pad retainer, the outboard pad retainer, or both), the brake pads, or both to move along the rail. The rail attachment may have any shape so that the rail attachment attaches to the rail and allows the pad retainers, the brake pads, or both to move along the rail. The rail attachment may be "T-shaped," a ball and post shaped, have a larger head and smaller body that extends out of the rail, a book, a "C-shape," a mating shape to a rail, or a combination thereof. The pad retainers may be connected to the caliper in any manner so that as one or more pistons extend out of the one or more piston bores the pad retainers move the brake pads to create a friction force.

The inboard pad retainer may be any device that holds a brake pad, a friction plate, friction material, a pressure plate, or a combination thereof (hereinafter "brake pad"). The inboard pad retainer may be any part, that assists in creating a braking force during a brake apply. The caliper may be free of an inboard pad retainer. The inboard pad retainer may assist in moving a brake pad during a brake apply. A brake pad may be permanently attached to the inboard pad retainer. A brake pad may be removably attached to the inboard pad retainer. The inboard pad retainer may be fixed. Preferably, the inboard pad retainer may be movable. The inboard pad retainer may be moved by an inboard piston located in an inboard piston bore. The inboard pad retainer may attach the brake pad to a piston so that the piston and brake pad move in unison. The brake pad may be supported on the piston by the inboard pad retainer so that the inboard pad retainer is free of attachment to the bridge. For example, an inboard pad retainer may be a clip that attaches the brake pad to the piston. The inboard pad retainer may move along an axial direction, with respect to a piston bore, so that a friction force may be created. The inboard pad retainer may move along the bridge. The inboard pad retainer may be a unitary piece extending from the bridge. The inboard pad retainer and the bridge may be formed together. Preferably, the inboard pad retainer is a separate piece that is attached to the bridge. The inboard pad retainer may remain static during a brake apply with respect to the bridge of the caliper. For example, the entire caliper may move and thus the inboard pad retainer may move with the caliper; however, the inboard pad retainer remains static relative to the bridge. The inboard pad retainer may have 1 or more fingers, 2 or more fingers, or 3 or more fingers. The inboard pad retainer may form an angle with the bridge, the piston bore axis, or both. The inboard pad retainer may form substantially a right angle with the bridge, the piston bore axis, or both. The inboard pad retainer may form the same angle with the bridge, the piston bore axis, or both as Preferably, the inboard pad retainer may be attached to the rail of the bridge by a rail attachment.

The one or more piston bores may be located on an inboard side, an outboard side, or both of the caliper. The caliper may include one or two piston bores on an inboard side and one or two piston bores on an outboard side. Preferably, the caliper includes only one piston bore on ah inboard side of the caliper. More preferably, the caliper is free of opposing pistons, piston bores, or both. The caliper may be free of pistons, piston bores or both on opposing sides of the bridge. Each piston bore houses a piston that axially extends along the piston bore axis into contact with a brake pad and moves the brake pad into contact with a rotor so that a brake apply is created. The brake pad may be fixed to the piston, thus, the piston and brake pad may move together axially along the piston bore axis to create a friction force. If one or more pistons are used, each piston may be moved by a different device. Preferably, each piston may be moved by the same device. The device to move the piston may be connected to the piston bore, part of the piston bore, or a combination of both. The device to move the piston may be located proximate to or directly to each piston bore.

The device to move the piston may be a fluid. The fluid may be introduced info the piston bore so that as the pressure of the fluid increases the piston is displaced by the fluid. The fluid may be introduced into the piston bore via a fluid inlet in the piston bore. The fluid inlet may be located at any location on the piston bore so that as fluid is added into the piston bore during a brake apply the piston moves. The fluid inlet, preferably, is located in the piston bore at an end of the piston so that as fluid enters the piston bore the fluid pushes the end of the piston so that a brake apply is created.

The device to move the piston may be an electric drive. The electric drive may be any electric operated device that moves the piston upon an application of power. The electric drive may have a shaft that is in communication with the piston so that during a brake apply the shaft pushes the piston and brake pad into the rotor, and during a brake off the motor allows the shaft to free float, the motor retracts the shaft after a brake apply, or both. The electric drive may be free of a piston and may directly move the brake pads.

The device to move the piston may be a cable actuation device. The cable actuation device may be any device that upon tensioning, releasing tension, or both of a cable a piston moves. The cable actuation device may include a cable having a eyelet, a barrel, a loop, a crimp, or a combination thereof for connection to a lever that may be actuated during a brake apply so that the lever moves the piston and creates a braking force. The device to move the piston may be located proximate to a shoulder of the caliper, the piston bore, on a support device or knuckle, or a combination thereof.

The shoulder may foe any part of the caliper that attaches the caliper to a support device. The shoulder may be a unitary part of the caliper. The shoulder may attach to a piston bore, a bridge, or both. The shoulder may have any shape and configuration so that the caliper is attached to a knuckle, a support device, or both. The shoulder may form substantially a right angle with the bridge, the piston bore axis, or both. The bridge and shoulder may have a cantilever attachment. For example, the bridge may be connected to the shoulder on one end so that the bridge extends and is supported only by the shoulder. The caliper may have one large shoulder that forms a mating relationship with a knuckle, a support device, or both. Preferably, the shoulder is comprised of two or more bodies. The two or more bodies may be located proximate to each other. Preferably, the two or more bodies are spaced apart so that an adjoining portion of a support device may extend between the two or more bodies to form a connection. The two or more bodies may have any configuration so that the caliper and the knuckle, the support device, or both form a connection with sufficient strength so that the caliper may be used to produce a braking force. The two or more bodies may be spaced apart so that the bodies have sufficient strength to withstand radial forces applied during a brake apply, to assist in created a braking force, or both. The two or more bodies of the caliper, preferably, are located on the outside of the caliper so that the portions of the knuckle, the support device, or both fit between the two bodies of the caliper. The connection between the two or more bodies and the knuckle, the support device, or both may be any configuration so that the braking device may produce a braking force during maximum stress (e.g., during an emergency stop), may withstand forces during a maximum stress brake apply, or both. The connection between the caliper and the support device may have a home position.

The home position may be any position so that an axis parallel to the knuckle when viewed along a side view (i.e., viewed in the direction along an axis of the one or more fasteners) may form an angle with a plane substantially parallel to the bridge of the caliper, the piston bore axis, or both. For example, the axis may run parallel to the knuckle, one or more bodies, or both and the axis forms an angle with the piston bore when the caliper is in the home position. The axis parallel to the knuckle, when viewed from a side view, may be substantially a right angle with the bridge, a plane parallel to the bridge, the piston bore axis, or a combination thereof in the home position. The axis parallel to the knuckle may align with the shoulder, one or more bodies, or both when the caliper is in the home position. The home position may be an angle of about 85 degrees or more, about 88 degrees or more, about 89 degrees or more preferably about 90 degrees or more. The home position may be about 95 degrees or less, preferably about 93 degrees or less, or about 92 degrees or less. The home position may form the same angle when the brake pads are new and when the brake pads are worn. The home position and the running position may be the same position may form the same angle between the axis parallel to the knuckle when viewed along a side view and the bridge, a plane parallel to the bridge, the piston bore axis, or a combination thereof. During a brake apply the movement of the piston may move the caliper so that a braking force is created.

The caliper may move from the home position to a brake-on position during a brake apply. The caliper may move a first distance when the brake pads are new and a second distance when the brake pads are worn, thus, the angle may be vary based upon the condition of the brake pads. The caliper may move forward during a brake apply so that the angle between the axis parallel to the knuckle, when viewed along a side view, and the bridge of the caliper, a plane substantially parallel to the bridge of the caliper, the piston bore axis, or a combination thereof is about 90 degrees or less. The caliper may move backwards during a brake apply so that the angle between an axis parallel to the knuckle, when viewed in a side view, and the bridge of the caliper, a plane substantially parallel to the bridge of the caliper, the piston bore axis, or a combination thereof is 90 degrees or more. The angle during a brake apply may be about 90 degrees or more, preferably about 91 degrees or more, mere preferably about 92 degrees or more. Depending on the condition of the brake pads the angle may be about 95 degrees or more, about 100 degrees or more, or about 105 degrees or more. Preferably, the angle during a brake apply may be about 140 degrees or less, about 125 degrees or less, or about 115 degrees or less. The connection between the two or more bodies and the knuckle, the support device, or both may be made by any device that will fixedly secure the caliper to the knuckle, the support device, or both.

One or more fasteners may foe used to connect the shoulder to the knuckle, the support device, or both. The shoulder, the knuckle, the support device, or a combination thereof may have one or more attachment features so that the caliper may be fixedly attached to an adjacent structure. The attachment features may be any feature that may assist in attaching a shoulder to a support device. Preferably, the attachment feature is one or more through holes, one or more partial holes, or both located in the adjoining structures (e.g., shoulder, bodies, knuckle, support device, or a combination thereof) so that one or more fasteners may be placed into the adjoining attachment feature and secure the parts together. The attachment feature and the fasteners may form an interference fit such that once the fastener is press fit info the attachment feature the fastener will be retained in the attachment feature and connect the parts together. The attachment features in the shoulder, the knuckle, the support device, or a combination thereof may foe the same size, different sizes, or both. The attachment features in the shoulder, the knuckle, the support device, or a combination thereof may be the same size as the one or more fasteners, larger than the fasteners, or both. The attachment feature may foe any shape, size, configuration, or a combination so that the shoulder may be attached to a support structure. The attachment features may be smooth, threaded, tapered, oval, round, square, or a combination thereof. The fasteners may be any fastener that, when placed through a shoulder (i.e., one or more bodies) and an adjacent knuckle, support device, or both, attaches the shoulder to the adjacent structure. The fasteners may form a threaded connection, may extend though the attachment features and form a pinned connection, may be a bolted connection, or a combination thereof. The fastener may form a connection that has sufficient strength so that the fastener, the shoulder, the knuckle, the support device, or a combination thereof may withstand a maximum stress braking event (i.e., an emergency brake apply). The fastener may form any connection so that the caliper may move during a brake apply, brake off, or a condition therebetween. The fastener may fee used with a spacer.

The spacer may be any configuration so that the spacer reduces the gap between the fastener and the respective part of the caliper, the spacer provides a pre-load on a body, the spacer prevents the fastener from loosening, or a combination thereof. The spacer may be made of any material that performs the functions discussed herein. The spacer may be made of metal, plastic, rubber, a synthetic material, a natural material, or a combination thereof. The spacer may prevent the caliper from moving from side to side along the knuckle, the support device, or both (i.e., radially relative to the rotor). The spacer may allow the caliper to move in an outboard direction, an inboard direction, or both.

The caliper may move any distance so that the caliper creates a braking force during a brake apply, the brake pads and rotor have minimal contact during running, disc thickness variation (DTV) is minimized, brake torque variation (BTV) is minimized, or a combination thereof. As discussed herein disc thickness variation is the distance between the inner face and outer face of a rotor when measured at different tangential locations along the rotor. Stated another way DTV is the change in thickness between the faces of the rotor as the thickness is measured along the faces of the rotor. As discussed herein brake torque variation (BTV) is defined as the different in torque output as the rotor rotates to different positions, the torque being unrelated to differences in input pressure of the piston. Stated another way BTV is a change in pressure on the rotor as the rotates due to changes in thickness of the rotor, wobble of the rotor, or both. The caliper may move towards the outboard side, the inboard side, or both. The total travel distance of the caliper may be any distance so that both brake pads contact the rotor to create a braking force. The total travel distance of the caliper may be sufficient so that both brake pads contact the rotor during a brake apply, and so that during running the brake pad are substantially free of contact with the rotor. The caliper may have a total travel distance of about 1 mm or more, about 2 mm or more, about 3 mm or more, or about 4 mm of more. The caliper may have a total travel distance of about 10 mm or less, about 8 mm or less, or about 8 mm or less. The total travel distance may be the distance of travel from a furthest distance the caliper may move in the outboard direction to the furthest distance the caliper may move in the inboard direction.

The shoulder, the knuckle, the support device, or a combination thereof may form a connection with a mating relationship. The connection may have one or more gaps between the shoulder, the knuckle, the support device, or a combination thereof. The one or more gaps may be any size and shape so that the caliper may rotate around the fastener during a brake apply, a brake off, or a condition therebetween. The one or gaps may be any size and/or at any location so that during a brake apply, brake off, or a condition therebetween the caliper may move so that the brake pads are substantially aligned with the rotor so that the faces of the brake pads do not contact the rotor during a brake off and the faces of the brake pads contact the rotor along their length during a brake apply. The one or more gaps may be located between the bottom of the one or more bodies, one or more shoulders, or both and the top of the knuckle, the support device, or both; the one or more gaps may be located between a side of a body, a shoulder, or both and the knuckle and/or the support device; or both. The one or more gaps may be any size so that the caliper may move during a brake apply; a brake off, or a condition therebetween. The one or more gaps may be 0.001 mm or more, about 0.01 mm or more, or about 0.1 mm or more. The one or more gaps may be about 3 mm or less, about 2 mm or less, or about 1 mm or less. The bodies, shoulder, knuckle, support device, or a combination thereof may be shaped so that the one or more gaps have a configuration such as a flat, a contoured, a rounded, a square, or a combination thereof. For example, one side of the gap may have a "U" shape and the opposing side of the gap may be generally flat so that as the caliper rotates the caliper contacts an upper portion of the "U" and further rotation is prevented. The opposing surfaces of the gap may have a substantially co-planar relationship so that the caliper rotates a slight amount before the two surfaces contact and prevent further rotation. The opposing surfaces of the gap may be matches so that they have a similar shape. The one or more gaps may be free of any tabs.

Preferably, the one or more gaps may include one or more tabs. The tabs may be any device that may assist in locating or manipulating the location of the caliper by rotating the caliper, aligning the caliper, stabilizing the caliper, centering the caliper on a fastener, maintaining a gap, retracting the caliper from a brake on position to a running position, or a combination thereof. The one or more tabs may be static, may bias, may be flexible, may be rigid, may act to seal the gap, or a combination thereof. The tabs may be used in conjunction with one or more bushings that seal around the one or more fasteners that may be located anywhere so as to maintain the location of the caliper. The one or more tabs may act as a spacer between the caliper and a support device, a knuckle, or both. The one or more tabs may be located at any location along the connection points. The one or more tabs may be located between a shoulder, a knuckle, a support device, a fastener, a bushing, or a combination thereof so that the tab provides a load between the two opposing parts, align the opposing pads, or both. The one or more tabs may work in conjunction with one or more of the parts of the braking system discussed herein so that the brake pads move into contact with a rotor and create a friction force. The tab includes a body.

The body may include a sleeve and a deflection arm. A fastener may extend through the body and a sleeve so that the fastener connects the caliper to a support device and/of a knuckle. The sleeve may project away from the body. The sleeve may project out so that the sleeve fits within an attachment feature of a caliper, a shoulder, a knuckle, a support device, a body, or a combination thereof. The sleeve may be any size and shape so that the sleeve fits within an attachment feature and so that a fastener may extend into and through the sleeve. Preferably, the sleeve extends into a knuckle and/or a support device and a fastener extends through the tab so that the tab separates the fastener from the knuckle and/or support device. The sleeve may be round, oval, square, a complementary shape to a fastener and/or an attachment feature, or a combination thereof. The sleeve may have any length so that the sleeve provides support to the fastener, the caliper, the support device, the knuckle, or a combination thereof so that the tab assists in positioning the caliper. The sleeve may have a continuous diameter when measured at any point along the circle. The sleeve may include a portion where the diameter of the sleeve is larger. For example, the sleeve may have a housing where the sleeve extends out to accommodate a fastener and/or a locking tab. The sleeve may include one or more housing features for accommodating one or more flares.

The flares may be located at any location along the length of the sleeve. The flares may be located at any location on the tab so that the flares assist in maintaining the position of the tab relative to the fastener, the knuckle, the support device, the caliper, or a combination thereof. The flares may assist in fitting the tab in an attachment feature, fitting a fastener in the attachment feature, fitting the tab to the fastener, or a combination thereof. Preferably, the flares fit the tab to the knuckle, the support device, or both so that the position of the tab is maintained and the caliper rotates around the tab. The one or more flares may be any device that assists in holding the tab to the fastener, the knuckle, the support device, the caliper, or a combination thereof. The one or more flares may be a portion of the sleeve that extends towards the fastener, the knuckle, the support device, the caliper, or a combination thereof so that the tab fits within the knuckle and/or support bracket and a fastener fits within the tab. The one or more flares may create a friction fit, an interference fit, may resist pull back, may resist rotation of the tab, or a combination thereof between the tab and the support device, the knuckle, the fastener, or a combination thereof. The one or more flares may elongate the tab so that the tab fits within an elongated attachment feature. For example, the one or more flares may extend a portion of the sleeve so that the sleeve contacts an attachment feature at multiple locations so that the sleeve substantially fills the attachment feature and so that the tab may accommodate a non-elongated fastener. The flares may be any shape and size so that the flares adjust the shape of the sleeve to the shape of the attachment feature. The flares may be shaped so that the flare extends outside of the sleeve so that the flare is a raised portion that extends above the sleeve. The flares may be shaped so that the flares create a recess and/or a pocket on the inside of the sleeve. The flares may be a portion of the sleeve that is extended above the sleeve so that the extension fits an elongated attachment feature. The flare may be any portion that is shaped so that the tab fits in an elongated attachment feature (e.g., an ellipse, oval, rectangle, the like or a combination thereof). Preferably, the flares are a portion that enables the tab to fit within an elongated attachment feature and simultaneously accommodate a standard shaped fastener (e.g., a circular fastener). The sleeve may include one or more, two or more, three or more, or even four or more flares. Preferably, the sleeve includes two flares located on opposing sides of the sleeve (i.e., 180 degrees apart). The one or more flares and sleeves may be located below a deflection arm.

The deflection arm may be any part of the tab that extends out from the body. The deflection arm may be any device that flexes during rotation of the caliper so that the deflection arm assists in moving the caliper. The deflection arm may assist in moving the caliper during a brake apply. Preferably, the deflection arm assists in moving the caliper to a home position when a brake apply is complete. The deflection arm may fit within any gap between the knuckle, the support device, and the caliper so that during movement of the caliper relative to the support device and/or the knuckle the tab moves, resists movement, or both. The deflection arm preferably extends over a portion of a knuckle and/or a support device and under a portion of the caliper so that during movement of the caliper the caliper contacts the deflection arm so that once a brake apply is complete the deflection arm assists in moving the caliper to the home position. A portion of the knuckle and/or support device may be sandwiched between the sleeve and the deflection arm. The deflection arm may be substantially parallel to the sleeve. The deflection arm may be planar (i.e., extend within one plane). The deflection arm may be stepped. For example, the deflection arm may extend in a first plane and then angle down into a second plane so that the deflection arm places pressure on the fastener, the caliper, the knuckle, the support device, or a combination thereof when the deflection arm is in the home position, during a brake apply, or a condition therebetween. The deflection arm may be angled up or down. The deflection arm may have any orientation so that the deflection arm assists in reorienting the caliper after a brake apply so that the brake pads and rotor are free of contact during running.

The rotor may be any rotor that when contacted by brake pads create a braking force. The rotor may be any rotor with two opposing braking surfaces so that brake pads may contact the opposing braking surfaces to create a friction force.

The brake pads may be any brake pad that may be useful in creating a friction force. The brake pads may include a pressure plate and a lining material. The brake pads may be free of a pressure plate. The lining material may have sufficient strength so that the lining material may attach the brake pads to a pad retainer. The inboard brake pad and the outboard brake pad may be made of the same material, different material, or a combination thereof. Preferably, the inboard brake pad and the outboard brake pad are made of different materials. More preferably, the outboard brake pad may be made of a harder material than the inboard brake pad. One brake pad may be made of a material that wears slower than the opposing brake pad. The lining material of the brake pads have a ratio of wear. For example, one brake pad lining material may wear about 1 mm and the opposing brake lining material may wear about 2 mm during an equal braking distance (i.e., 1:2). The ratio of wear of the lining material may be about 1:1, about 1:2 or more, about 1:2.5 or more, about 1:3 or more, or about 1:3.5 or more. The ratio of wear of the lining material may be about 1:10 or less, about 1:8 or less, about 1:6 or less, or about 1:5 or less.

An air gap may exist between the brake pads and the rotor during running. The air gap may be formed by any known method such as retraction of the piston and related brake pad by a seal in a seal groove. The air gap may be created by compression and/or deflection and subsequent decompression and/or deflection of the brake pad, the rotor, or both. The brake system as discussed herein may be free of "spring back" caused by bushings, boots, pad, clips, compressibility of the brake pad linings, the rotor, or a combination. The air gap may be created by the brake pads contacting the rotor, and the runout of the rotor moving the brake pads, the caliper, the pad retainers, or a combination thereof so that the air gap is created and contact between the brake pads and the rotor is minimized during running, brake off, or both.

FIG. 1 illustrates a caliper 2 directly attached to a knuckle 100. The caliper 2 includes a piston bore 4 housing a piston 6 (not shown). The piston bore 4 includes a fluid inlet 12 for introducing fluid during a brake apply so that the piston 8 (not shown) moves. The caliper 2 has a bridge 8 including a rail 10. The bridge 8 terminates on one end at an outboard pad retainer 30 for holding an outboard brake pad 32 (not shown). The caliper 2 is attached to the knuckle 100 via a shoulder 40. The shoulder 40 as illustrated includes two body portions 42. Fasteners 44 extend through the body portions 42 so that the caliper 2 is connected to the knuckle 100. A spacer 48 separates each fastener from the shoulder 40.

Figure 2:
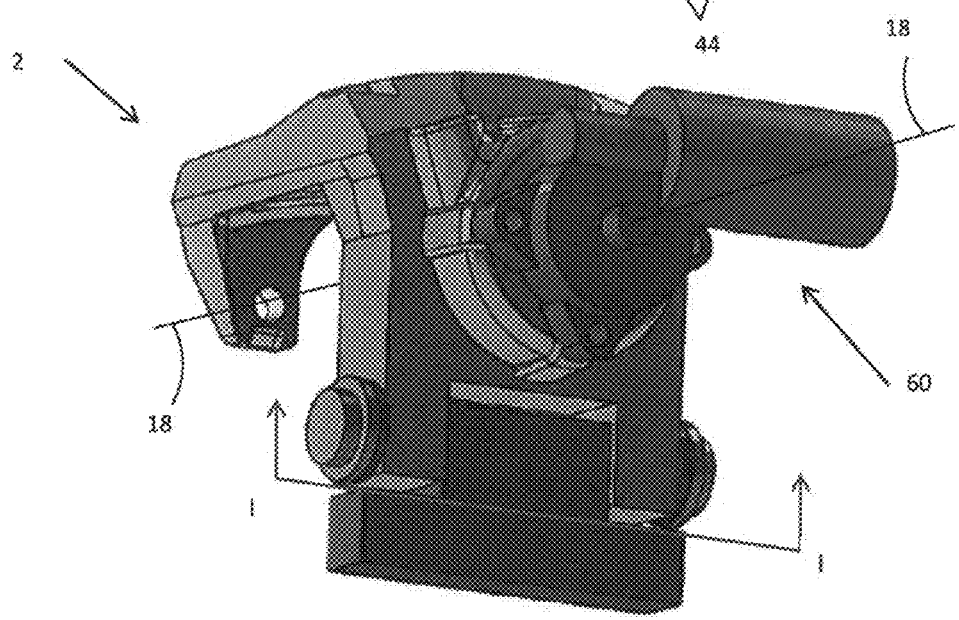
FIG. 2 illustrates another possible embodiment of the disc brake system.

FIG. 2 illustrates a caliper 2 including an electric drive 80 for moving the piston 6 (not shown) along the piston bore axis 18 during a brake apply.

Figure 3:
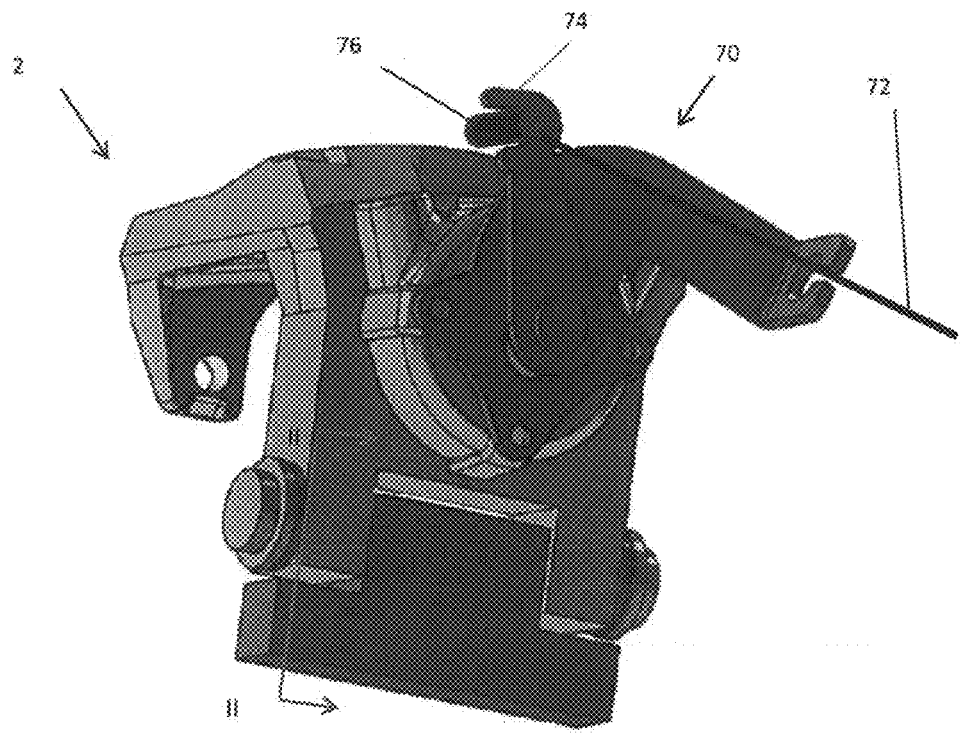
FIG. 3 illustrates yet another possible embodiment of the disc brake system.

FIG. 3 illustrates a caliper 2 including a cable actuation device 70 for moving the piston 6 (not shown) along the piston bore axis 18 when a cable 72 pulls the lever arm 74 via a barrel attachment 76.

Figure 4:
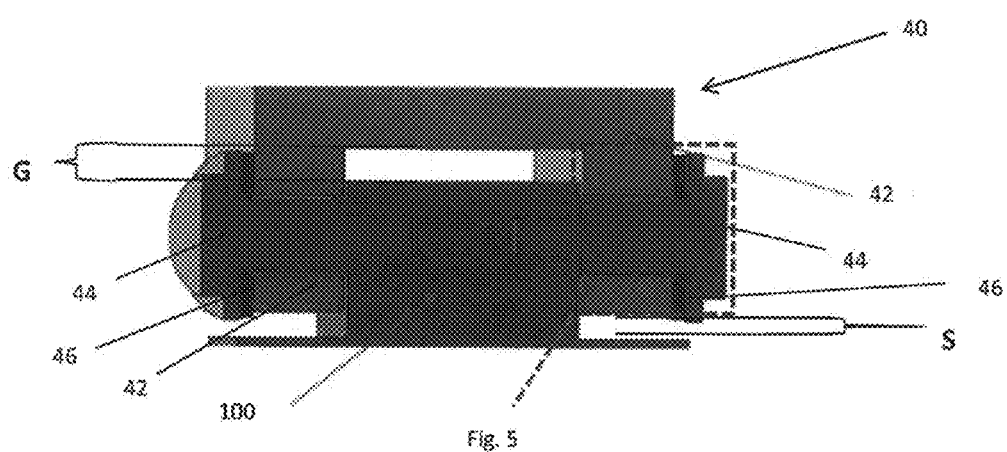
FIG. 4 illustrates a cross-sectional view along line I-I of FIG. 2.

FIG. 4 illustrates a cross-sectional view across cut I-I of FIG. 2. As illustrated the shoulder 40 is attached to the knuckle 100 via two bodies 42 each being connected by a fastener 44 including a spacer 46. A gap exists between an upper portion of the knuckle 100 and the shoulder 40 between the two body portions 42. A space exists between each body portion 42 and the knuckle 100. The gap has a width (G) and the space has a width (S) so that the caliper 2 can rotate around the fasteners 44 during a brake apply, a brake off, or a condition therebetween.

Figure 5:
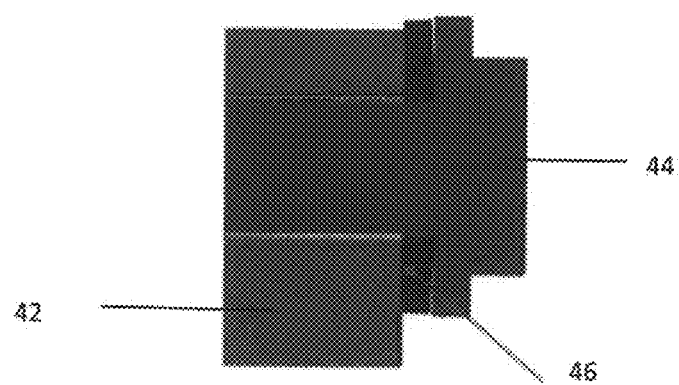
FIG. 5 illustrates a close-up view of a connection of FIG. 4.

FIG. 5 illustrates a close up view of one fastener 44 of FIG. 4. The fastener 44 extends into a body 42 of the caliper and includes a spacer 46 between a head of the fastener 44 and the body 42.

Figure 6:
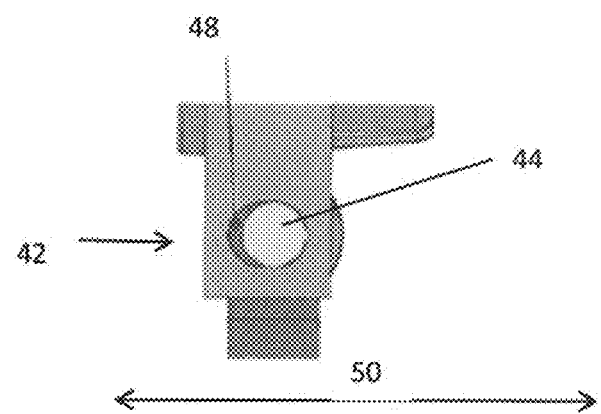

FIG. 6 illustrates a cross-sectional view of a body 42 cut along line II-II of FIG. 3. The body 42 as illustrated includes art attachment feature 48 that is oblong so that the fastener 44 is smaller than the attachment feature 48 and the body portion 42 can move back and forth as indicated by the arrows 50 during a brake apply, brake off, or a condition therebetween.

Figure 7:
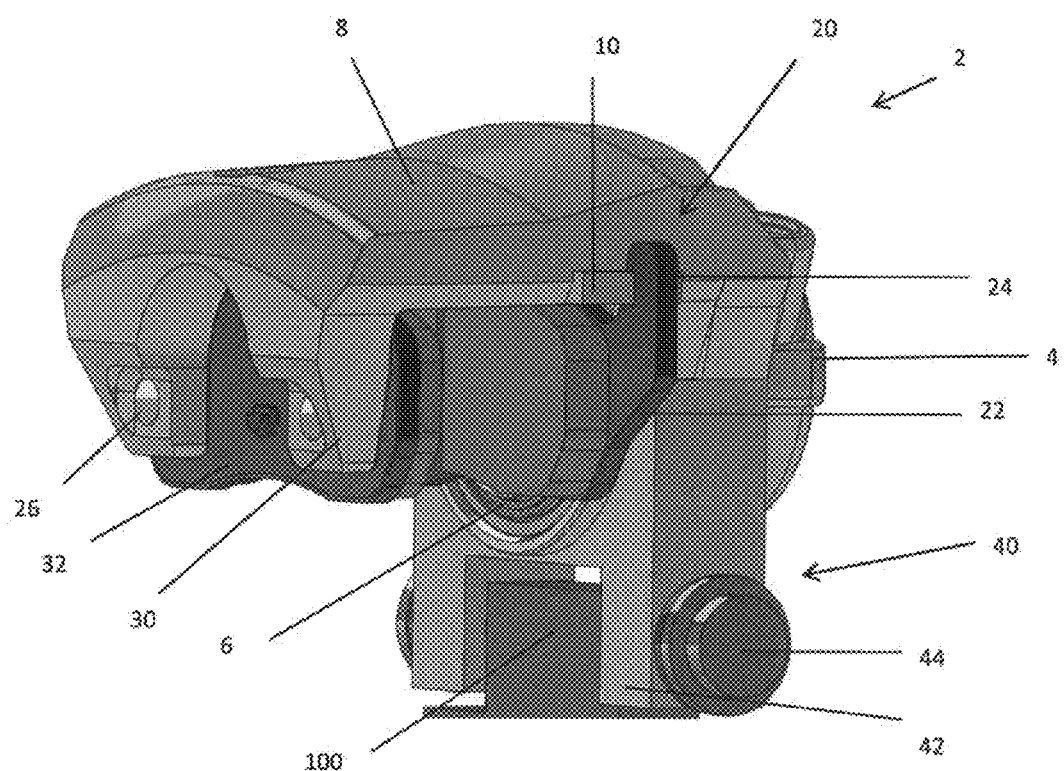
FIG. 7 illustrates one possible embodiment of the disc brake system.

FIG. 7 illustrates a caliper 2. The caliper 2 includes a piston bore 4 having a piston 6. A bridge 8 connects a piston bore 4 to an outboard pad retainer 30. The outboard pad retainer 30 includes a pad retainer attachment 28 for attachment to an outboard brake pad 32. The bridge 8 includes an inboard pad retainer 20 having a rail 10 on the outside of the bridge 8 and a rail attachment 24 for attaching the inboard brake pad 22 to the rail 10 via a rail attachment 24. The caliper 2 is attached to a support device 100 via a shoulder 40 with two bodies 42. The bodies 42 each include a fastener 44 that extends through each respective body 42 into the support device 100.

Figure 8:
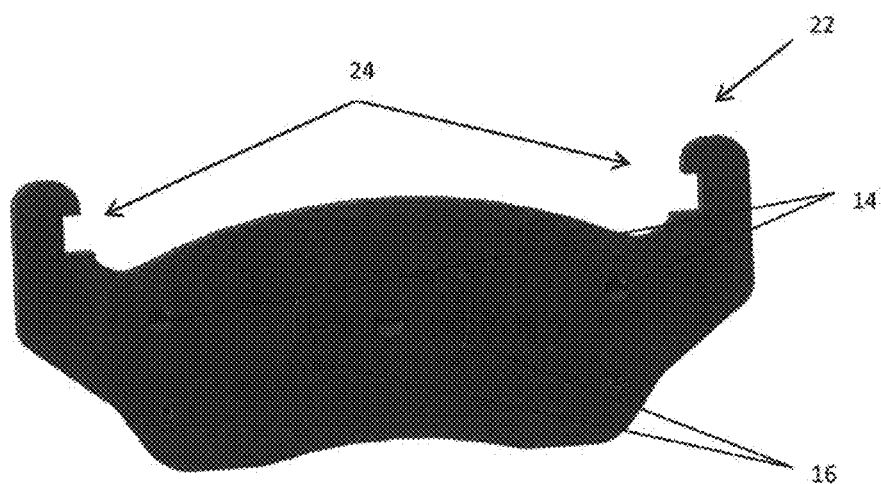
FIG. 8 illustrates a cross-sectional view along line II-II of FIG. 3.

FIG. 8 illustrates one embodiment of a brake pad as is illustrated in FIG. 7. The inboard brake pad 22 includes a rail attachment 24 on each side of the inboard brake pad 22. The inboard brake pad 22 includes a brake pad projection 14 for attachment to an outboard pad retainer 30 (not shown) that has a pad retainer attachment 26 (not shown). The inboard brake pad 22 includes a brake pad locator 18 for aligning the inboard brake pad 22 with a piston (not shown).

Figure 9:
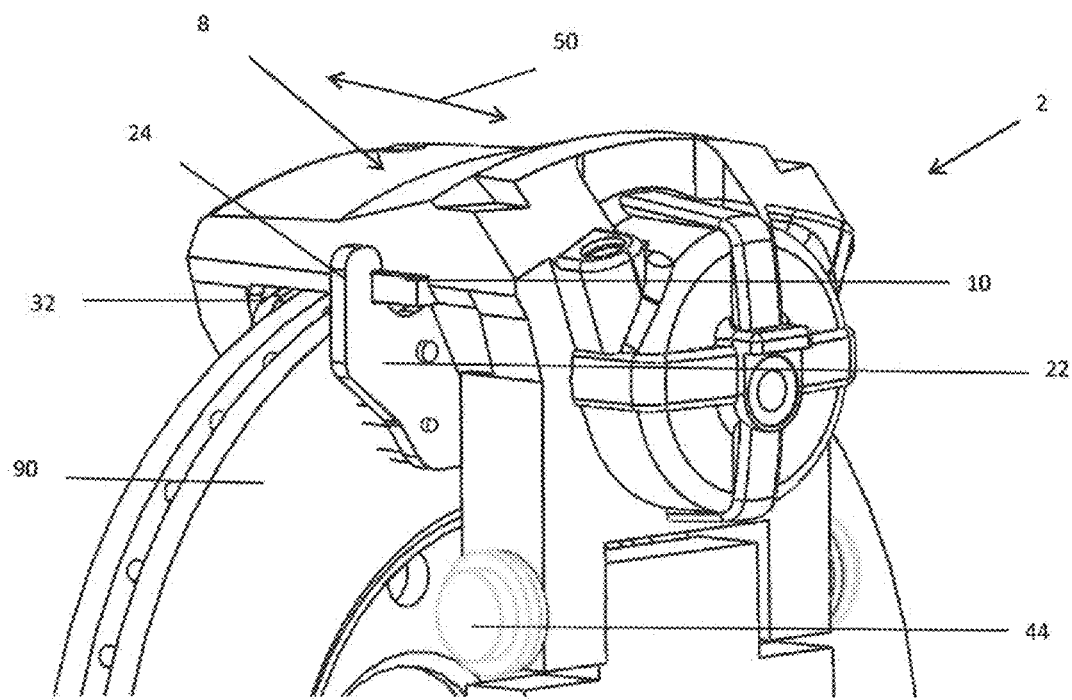
FIG. 9 illustrates a rear perspective view of the disc brake system of FIG. 7 including a rotor.

FIG. 9 illustrates a rear perspective view of a caliper 2. The caliper 2 includes an inboard brake pad 22 and an outboard brake pad 32 with a rotor 90 therebetween. The inboard brake pad 22 has a rail attachment 24 that attaches to a mil 10 on the bridge 8 of the caliper 2. The caliper 2 during a brake apply rotates around the fastener 44 in the direction 50 during a brake apply and a brake off.

Figure 10A:
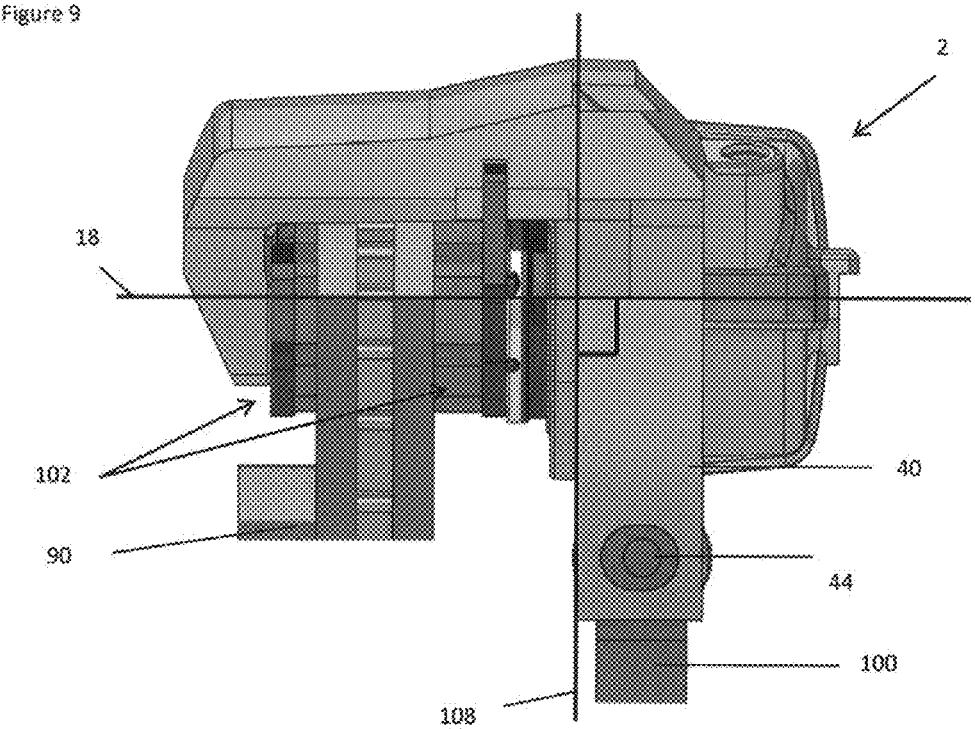
FIG. 10A illustrates a brake apply with new brake pads.
Figure 10B:
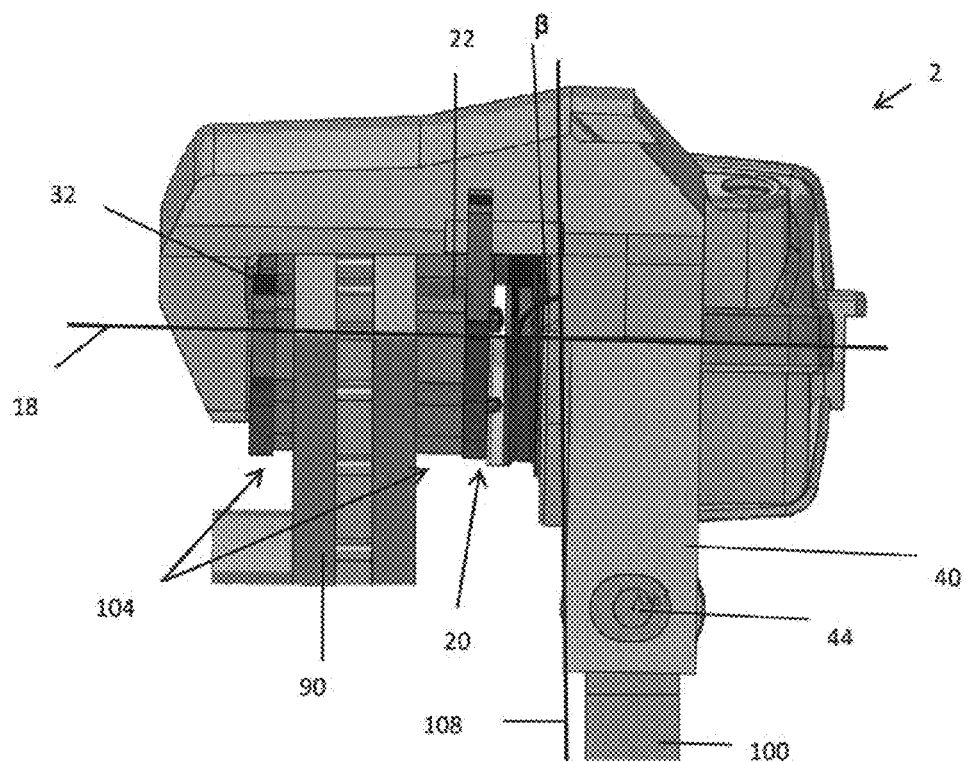
FIG. 10B illustrates a brake apply with worn brake pads.
Figure 10C:
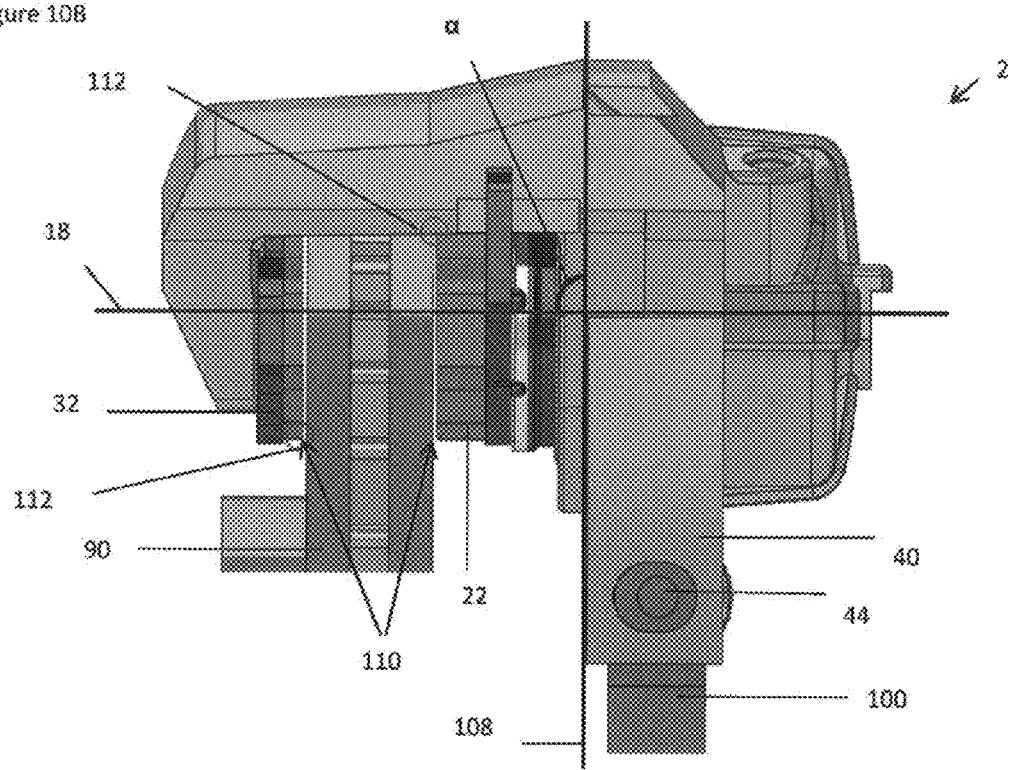
FIG. 10C illustrates a brake off.

FIGS. 10A-10C illustrate the caliper 2 of the present teachings during a brake release and a brake apply. FIGS. 10A and 108 illustrate brake applies with new brake pads 102 and worn brake pads 104 respectively, and the change in the body position during a brake apply. As illustrated, the caliper 2 of FIG. 10A includes new brake pads 102 contacting the rotor 90 so that the caliper is substantially free of rotation around the fastener 44 in the shoulder 40, to create a brake apply. The caliper 2, during a brake apply with new brake pads 102 is positioned so that the piston bore axis 18 forms substantially a right angle with a plane 108 parallel the knuckle 100 when viewed from a side view.

FIG. 10B illustrates the caliper 2 during a brake apply when the caliper 2 includes worn brake pads 104. As illustrated, during a brake apply the caliper 2 rotates around one or more fasteners 44 in a shoulder 40 so that the inboard brake pad 22 and the outboard brake pad 32 contact a rotor 90. The caliper 2 during a brake apply moves so that the piston bore axis 18 forms an angle (β) with a plane 108 along the knuckle 100 when viewed from a side view. As illustrates, the inboard brake pad 22 is connected via an inboard pad retainer 20.

FIG. 10C illustrates the caliper 2 in a brake off position. The caliper 2 rotates around the fastener 44 in the shoulder 40, and the caliper 2 moves so that the piston bore axis 18 forms an angle (α) with a plane 108 parallel to the knuckle 100, when viewed from a side view. The caliper 2 during a brake off rotates so that an air gap 110 is created between the inboard brake pad 22, the outboard brake pad 32, and the rotor 90. As illustrated the air gaps 110 is the smallest in the opposing corners 112 of the brake pads due to the rotation of the caliper 2 around a fastener 44.

Figure 11:
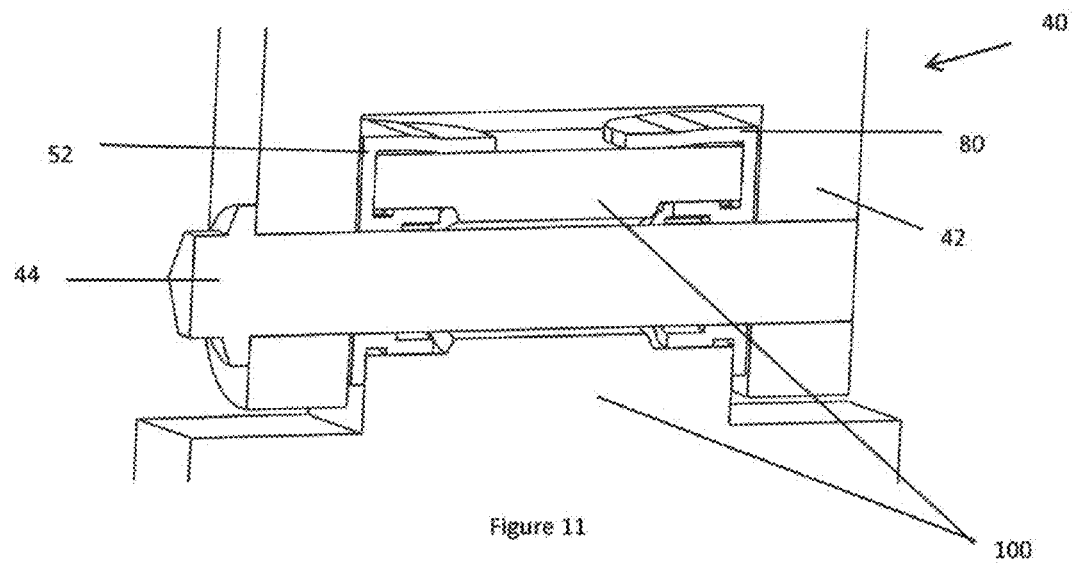
FIG. 11 illustrates a cross-sectional view of a shoulder and knuckle including a tab.

FIG. 11 illustrates a tab 80 located between a knuckle 100 and a shoulder 40 of a caliper. A fastener 44 extends through one body 42 through a first tab 80, the knuckle 100, a second tab 80, and extends into a second body 42. The tab 80 aligns the shoulder 40 of the caliper relative to the knuckle 100 so that alignment is maintained before, during, and after a brake apply.

Figure 12:
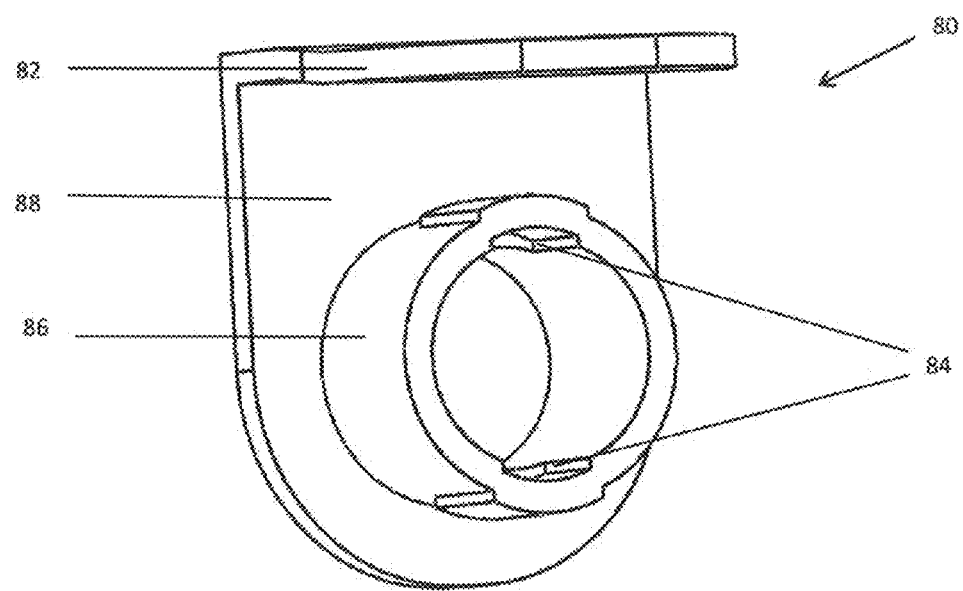
FIG. 12 illustrates one possible tab that may be used with the disc brake system.

FIG. 12 illustrates a tab 80. The tab 80 includes a deflection arm 82 that is spaced apart from a sleeve 88. The sleeve 86 extends into the knuckle 100 (not shown) and the deflection arm 82 extends over the knuckle 100 (not shown) so that during a brake apply, running, or a condition therebetween the deflection arm 82 assists in maintaining the caliper (not shown) in position and/or returning the caliper to a home position. The sleeve 88 includes two flares 84 for fitting the tab 80 into an attachment feature 48 (not shown) and for attaching the tab 80 to a fastener 44 (not shown). The tab 80 includes a body 88 that the deflection arm 82 and the sleeve 88 extend from.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to foe considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A device comprising:
   a. a caliper comprising:
      i. one or more piston bores housing a piston that is extendable along a piston bore axis;
      ii. an outboard pad retainer;
      iii. a bridge; and
      iv. a shoulder having one or more attachment features forming a through hole in the shoulder;
   wherein the caliper is configured to be attached directly to a knuckle of an automobile via the shoulder and one or more fasteners; and
   wherein the one or more attachment features are larger in the piston bore axis direction than the one or more fasteners so that the caliper when attached to the knuckle is capable of being displaceable along the piston bore axis.

2. The device of claim 1, wherein the device is free of a support bracket.

3. The device of claim 1, wherein the caliper is free of attachment to a support bracket.

4. The device of claim 1, wherein the outboard pad retainer is a unitary piece that extends from the bridge.

5. The device of claim 1, wherein the bridge includes a rail so that an inboard brake pad moves along the rail during a brake apply, a brake off, or a condition therebetween.

6. The device of claim 1, wherein the shoulder includes at least two bodies and the at least two bodies are spaced apart so that the knuckle extends between the at least two bodies and the shoulder attaches the caliper to the knuckle.

7. The device of claim 6, wherein the fastener extends through the at least two bodies and the knuckle so that the caliper is attached to the knuckle.

8. The device of claim 1, wherein a gap is located between the knuckle and the shoulder so that the caliper rotates during a brake apply, a brake off, or a condition therebetween.

9. The device of claim 8, wherein one or more tabs are located between the one or more fasteners and the shoulder, the knuckle, or both so that the one or more tabs provide a load on the caliper, the knuckle, or both and align the caliper with the knuckle.

10. The device of claim 9, wherein the one or more tabs include:
   a. a body;
   b. a deflection arm; and
   c. a sleeve having one or more flares;
   wherein the deflection arm and sleeve extend from the body, and the one or more fasteners extend through the sleeve and the one or more flares so that the one or more tabs accommodate the fastener and connect the device to the knuckle, and the one or more tabs fit within an attachment feature of the knuckle.

11. The device of claim 1, wherein the outboard pad retainer includes a brake pad with a lining material and an inboard pad retainer that includes a brake pad with a lining material and the lining materials of the brake pads are different.

12. The device of claim 11, wherein the lining material of the outboard brake pad is harder than the lining material of the inboard brake pad.

13. The device of claim 1, wherein the one or more piston bores include an electric drive for moving the pistons.

14. The device of claim 1, wherein the one or more piston bores include a fluid that moves the piston during a brake apply.

15. The device of claim 1, wherein in the one or more pistons include a cable actuation device that, moves the piston during a brake apply.

16. The device of claim 8, wherein the attachment features are smooth, oval, or both.

17. The device of claim 1, wherein a spacer is located between the fastener and the shoulder so that the spacer provides a pre-load on the shoulder.

18. A disc brake system comprising:
   a. a caliper comprising:
      i. one or more piston bores horsing a piston;
      ii. an outboard pad retainer;
      iii. a bridge having a rail so that an inboard brake pad moves along the rail during a brake apply, a brake off, or a condition thereof;
      iv. an inboard pad retainer;
      v. a shoulder including one or more attachment features forming an oblong through hole that extend through the shoulder; and
      vi. one or more tabs;
   b. a rotor connected to a knuckle of an automobile, wherein the bridge extends over the rotor;
   wherein the caliper is attached directly to the knuckle via the shoulder and one or more fasteners and the caliper is free of attachment to a support bracket;
   wherein the one or more tabs are located between the caliper and the knuckle; and
   wherein the caliper when attached to the knuckle via the one or more fasteners extending through the oblong through hole in the one more attachment features is capable of rotationally moving and moving along an axis of the rotor.

19. The device of claim 18, wherein a gap is located between the knuckle and the shoulder so that the caliper is rotationally movable during a brake apply, a brake off, or a condition therebetween; one or more tabs are located between the one or more fasteners and the shoulder, the knuckle, or both so that the one or more tabs provide a load on the caliper, the knuckle, or both and align the caliper with the knuckle; and
   wherein the one or more tabs include:
      a. a body;
      b. a deflection arm; and
      c. a sleeve having one or more flares;
   wherein the deflection arm and sleeve extend from the body, and the one or more fasteners extend through the sleeve and the one or more flares so that the one or more tabs accommodate the fastener and connect the device to the knuckle, and the one or more tabs fit within an attachment feature of the knuckle.

20. A device comprising:
   a caliper comprising:
      i. one or more piston bores housing a piston;
      ii. an outboard pad retainer;
      iii. a bridge;
      iv. one or more fasteners;
      v. a shoulder that is configured to be attached directly to a knuckle of an automobile via the shoulder and the one or more fasteners;
      vi. one or more tabs including:
         1. a body;
         2. a deflection arm; and
         3. a sleeve having one or more flares;
   wherein the deflection arm and sleeve extend from the body, and the one or more fasteners extend through the sleeve and the one or more flares so that the one or more tabs accommodate the one or more fasteners and connect the caliper to the knuckle, and the one or more tabs fit within an attachment feature of the knuckle;
   wherein the one or more tabs are located between the one or more fasteners and the shoulder, the knuckle, or both so that the one or more tabs provide a load on the caliper, the knuckle, or both and align the caliper with the knuckle; and
   wherein a gap is located between the knuckle and the shoulder so that the caliper is capable of rotating during a brake apply, a brake off, or a condition therebetween.

* * * * *

UNITED STATES PATENT AND TRADEMARK OFFICE
CERTIFICATE OF CORRECTION

PATENT NO. : 8,905,200 B2  
APPLICATION NO. : 13/616409  
DATED : December 9, 2014  
INVENTOR(S) : Kenneth Eric Gutelius It is certified that error appears in the above-identified patent and that said Letters Patent is hereby corrected as shown below:

In the Claims

Column 15, Claim 18, Line 53, "horsing" should be "housing"

Signed and Sealed this
Seventeenth Day of March, 2015

Michelle K. Lee
*Director of the United States Patent and Trademark Office*